United States Patent
Kim et al.

(10) Patent No.: US 12,013,295 B2
(45) Date of Patent: Jun. 18, 2024

(54) COMPOSITE COMPRISING IONIC LIQUID, PRESSURE SENSOR COMPRISING SAME, AND METHOD FOR MANUFACTURING PRESSURE SENSOR

(71) Applicant: Industry-University Cooperation Foundation Hanyang University, Seoul (KR)

(72) Inventors: Do Hwan Kim, Anyang-si (KR); Joo Sung Kim, Yongin-si (KR); Vipin Amoli, Suwon-si (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 548 days.

(21) Appl. No.: 17/287,244

(22) PCT Filed: Apr. 5, 2019

(86) PCT No.: PCT/KR2019/004045
§ 371 (c)(1),
(2) Date: Apr. 21, 2021

(87) PCT Pub. No.: WO2020/085591
PCT Pub. Date: Apr. 30, 2020

(65) Prior Publication Data
US 2021/0381912 A1  Dec. 9, 2021

(30) Foreign Application Priority Data
Oct. 22, 2018 (KR) .......... 10-2018-0126098

(51) Int. Cl.
*G01L 1/14* (2006.01)
*C08K 3/36* (2006.01)
*C08K 9/04* (2006.01)

(52) U.S. Cl.
CPC .......... *G01L 1/14* (2013.01); *C08K 3/36* (2013.01); *C08K 9/04* (2013.01)

(58) Field of Classification Search
CPC .... G01L 1/14; G01L 1/20; C08K 3/36; C08K 9/04; C08K 3/22; C08K 9/06
See application file for complete search history.

(56) References Cited

U.S. PATENT DOCUMENTS

2016/0164137 A1*  6/2016  Moganty .......... H01M 10/0565
                                                         429/306
2017/0059417 A1*  3/2017  Kim .................. G01L 1/142

FOREIGN PATENT DOCUMENTS

EP      2 239 537 A2     10/2010
KR   10-2008-0091455 A   10/2008
(Continued)

OTHER PUBLICATIONS

International Search Report for PCT/KR2019/004045 dated Jul. 17, 2019 (PCT/ISA/210).

*Primary Examiner* — David Z Huang
(74) *Attorney, Agent, or Firm* — Sughrue Mion, PLLC

(57) ABSTRACT

A composite including an ionic liquid, a pressure sensor including the same, and a method of manufacturing the pressure sensor are provided. The composite comprises an elastic polymer matrix, particles dispersed in the elastic polymer matrix, and an ionic liquid having a cation and an anion. The cation and the anion are bound by an intermolecular interaction on the surface of the particle to form an ionic double layer.

22 Claims, 13 Drawing Sheets

(56) References Cited

FOREIGN PATENT DOCUMENTS

| KR | 10-2010-0116621 A | 11/2010 |
|---|---|---|
| KR | 10-2017-0025694 A | 3/2017 |
| KR | 10-1876438 B1 | 7/2018 |

* cited by examiner

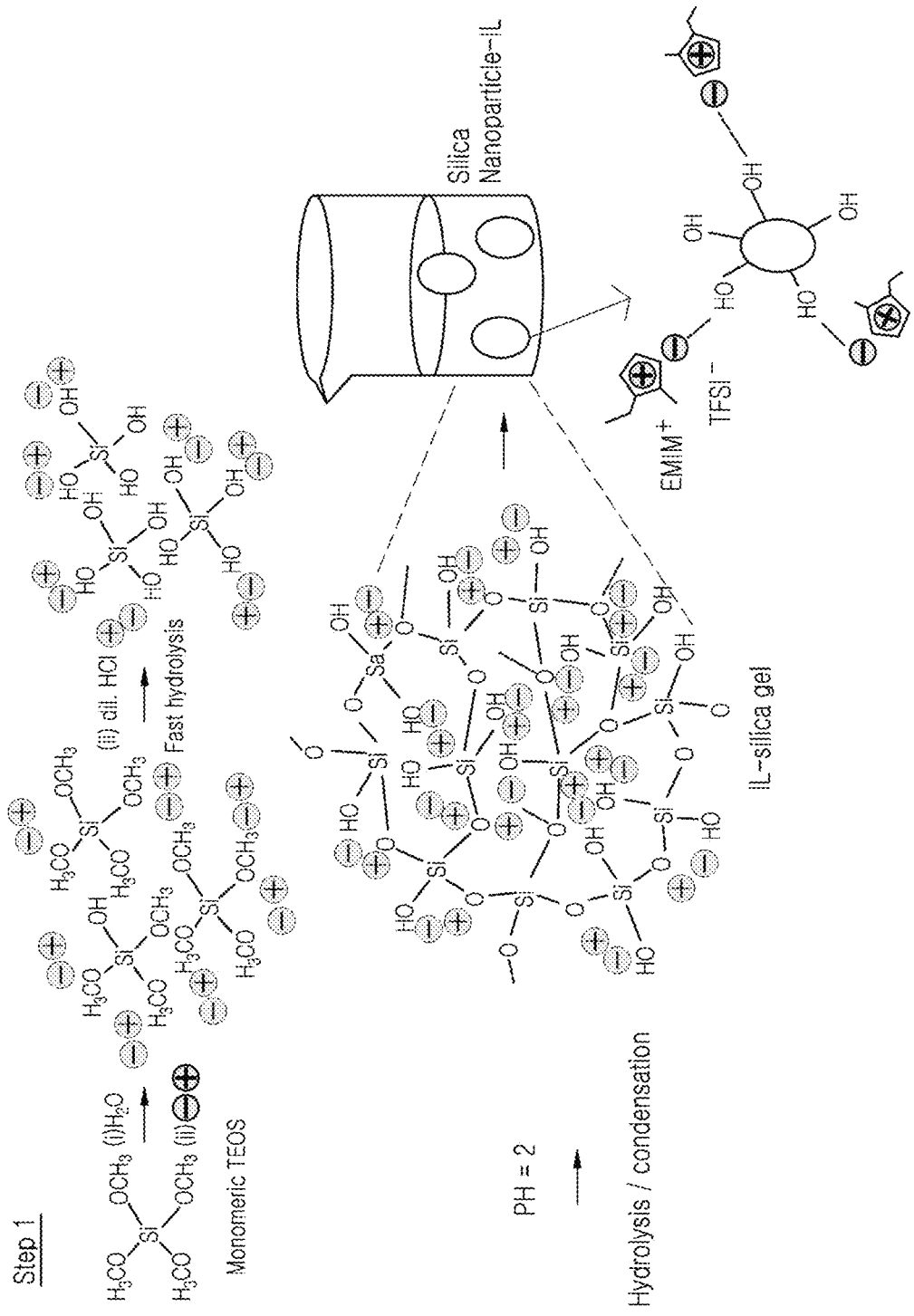

Step 2

Step 3 – Step 4

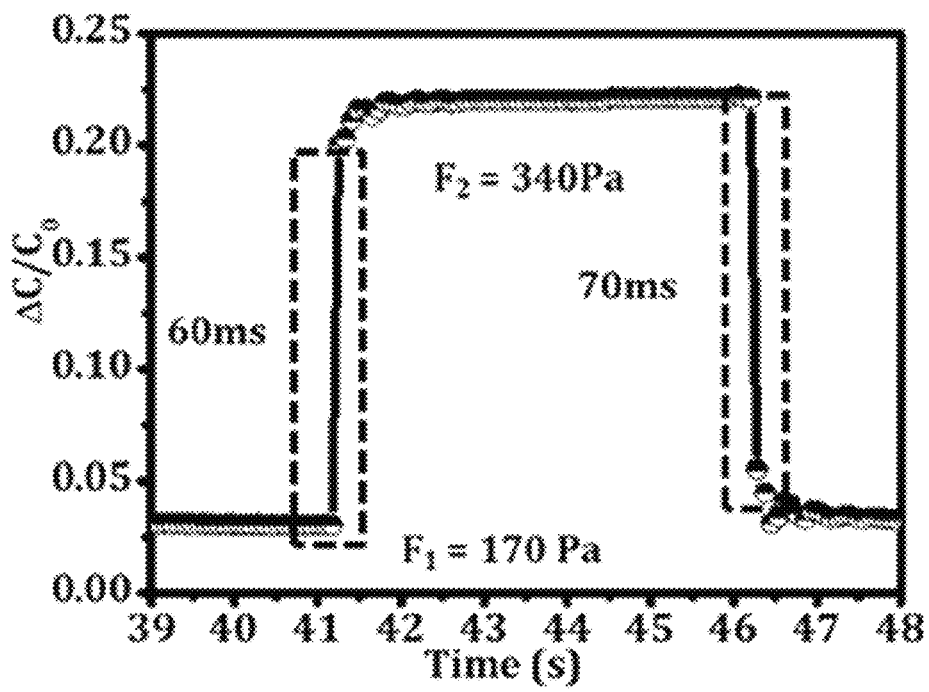
FIG.10 Response time
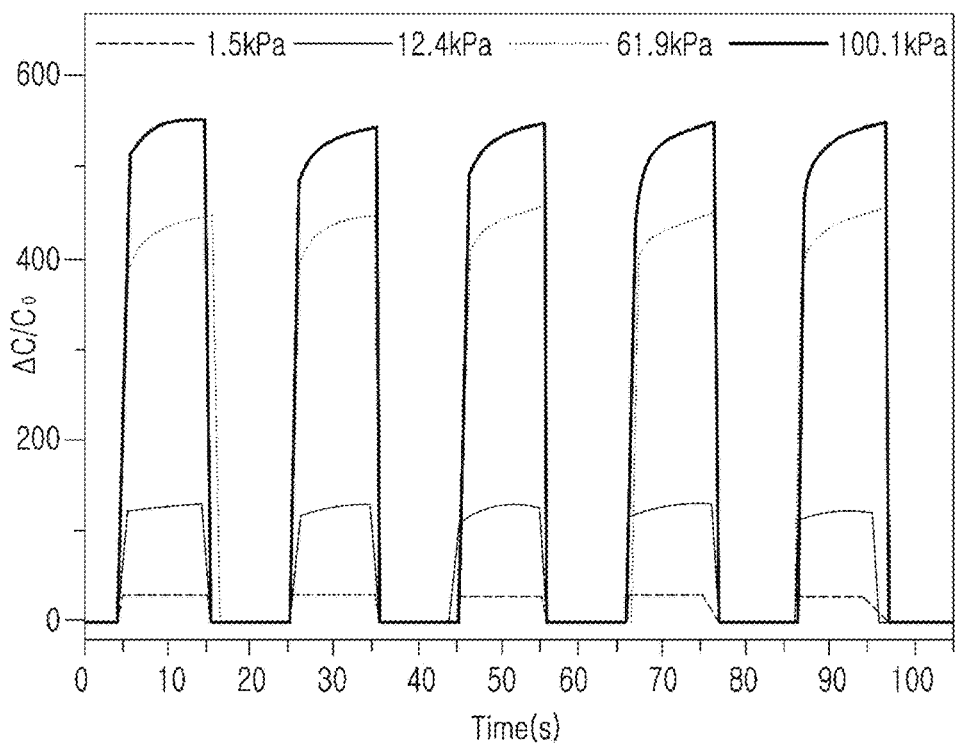
FIG.11 Repeatability

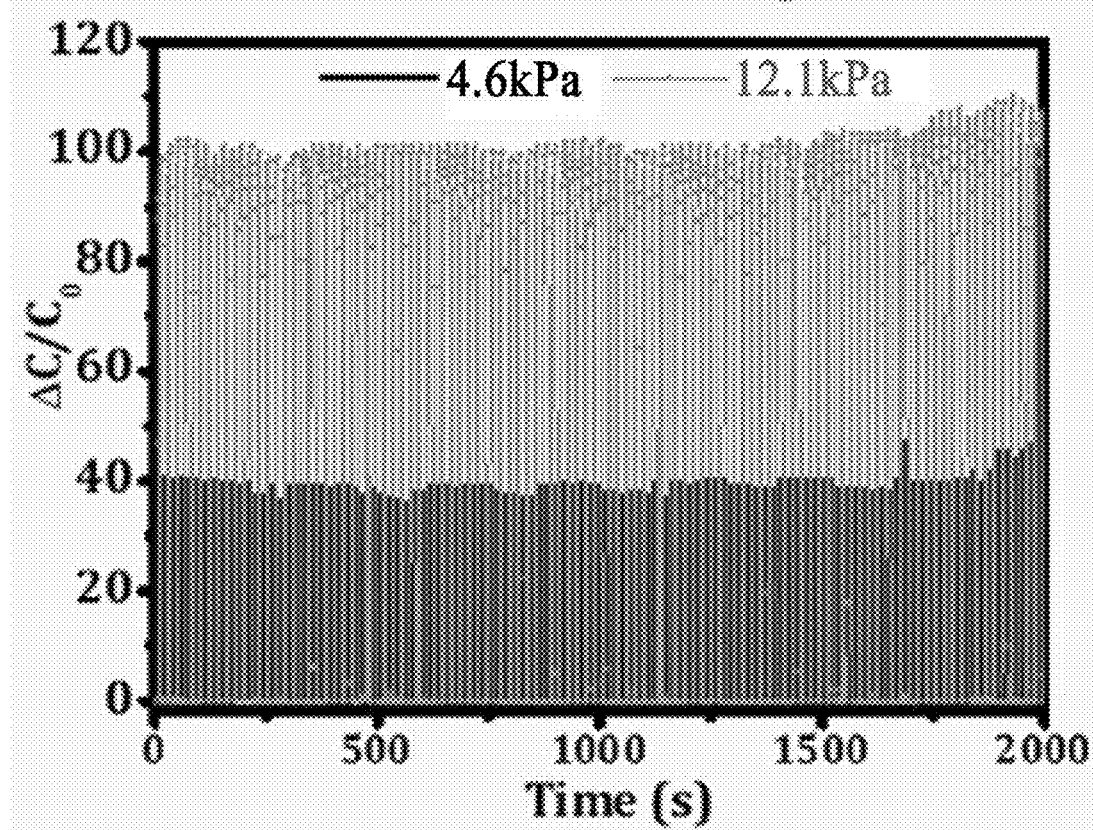

COMPOSITE COMPRISING IONIC LIQUID, PRESSURE SENSOR COMPRISING SAME, AND METHOD FOR MANUFACTURING PRESSURE SENSOR

CROSS REFERENCE TO RELATED APPLICATIONS

This application is a National Stage of International Application No. PCT/KR2019/004045 filed Apr. 5, 2019, claiming priority based on Korean Patent Application No. 10-2018-0126098 filed Oct. 22, 2018.

TECHNICAL FIELD

The present invention relates to a sensor, and more particularly, to a pressure sensor.

BACKGROUND ART

Recently, with the rapid development of electronic information devices, the spread of portable information & communication device and smart device is being activated. In the future, electronic systems are expected to evolve from a simple portable type to a form that can be attached to a human body or inserted into a human body. In particular, interest in artificial electronic skin or tactile sensors that can be bent or stretched and that can be attached to a bent part such as a human skin, body, or joint area is increasing.

Meanwhile, in the tactile sensor, there are a sensor using a change in resistance due to deformation (a piezoresistive phenomenon) and a sensor using a change in capacitance due to a change in a gap between electrodes due to external pressure. In general, tactile sensors are manufactured by a silicon semiconductor process. The silicon semiconductor process has the advantage of being able to manufacture fine channels, realizing high spatial resolution, and relatively excellent sensor performance. Moreover, if the well-established semiconductor CMOS technology is used together, complex signal processing problems can be solved by incorporating an amplifier and a decoder into the tactile sensor. Despite these advantages, silicon for implementing CMOS technology has weak durability and non-flexible characteristics, and thus cannot be attached to a curved surface.

In order to solve the above-described problem, research on a material capable of increasing durability by introducing various materials and recognizing very fine pressure and strain is being actively conducted. The development of these materials has established itself as a core technology that can be applied to the fields of artificial electronic skin, tactile sensors, prosthetics, robotics, and medical devices.

In this regard, International Publication No. WO 2013/044226 (title of the invention: artificial skin and elastic strain sensor) uses electrodes and an elastic material having a strain axis and two or more channels to detect and track the motion of a supporting structure, and discloses a technique for detecting a change in electrical resistance when cross-sections of the channels are deformed by the pressure is applied to the elastic material.

However, since such artificial skin measures only the deformation of the elastic material caused by external pressure, it sensitively detects electrical resistance only within a limited pressure range.

DISCLOSURE

Technical Problem

A technical problem to be solved by the present invention is to provide a material whose physical properties can be changed in response to a wide range of mechanical stimuli, and a pressure sensor having increased sensitivity and increased range of mechanical stimuli that can be sensed by using the material.

The technical problems of the present invention are not limited to the technical problems mentioned above, and other technical problems that are not mentioned will be clearly understood by those skilled in the art from the following description.

Technical Solution

In order to solve the above technical problem, an embodiment of the present invention provides a composite. The composite includes an elastic polymer matrix, particles dispersed in the elastic polymer matrix, and an ionic liquid having a cation and an anion. The cation and the anion are bound by an intermolecular interaction on the surface of the particle to form an ionic double layer. One of the cation and anion of the ionic liquid may be bonded to the surface of the particle by hydrogen bonding, and the other of the cation and anion of the ionic liquid may be bonded to the ion bonded on the surface of the particle by electrostatical attraction.

The particles may include metal, metal oxide, polymer, carbon, or two or more of them. The particle including the metal oxide may be silica, alumina, zirconia, or titania.

The Anion of the cation and the anion of the ionic liquid may have N, O, S, or F in a molecule and be bonded on the surface of the particles by the hydrogen bonding. The anion may be at least one anion selected from the group consisting of carboxylate, carbonate, phosphate, sulfonate, sulfate, cyanate, imide, bis(sulfonyl)imide, dicyanamide, hexafluoroantimonate, hydroxide, nitrite, and tetrafluoroborate. The anion may be a bis(sulfonyl)imide represented by the following Formula 1.

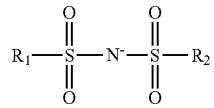

[Formula 1]

In Formula 1, each of $R_1$ and $R_2$ may be fluorine or a fluorinated alkyl group having 1 to 4 carbon atoms, regardless of each other.

The cation may be at least one cation selected from the group consisting of ammonium, choline, imidazolium, phosphonium, pyridinium, pyrazolium, pyrrolidinium, piperidinium, morpholinium, and sulfonium.

The elastic polymer matrix may include a thermoplastic elastic polymer that is a block copolymer of a hard segment and a soft segment. At least one of the hard segment and the soft segment may form a hydrogen bond on the surface of the particle. The thermoplastic elastic polymer may be polyester, polyurethane, or polyamide.

In the composite, the fluidity of the ionic liquid may be changed by the stimulation applied to the composite.

In order to solve the above technical problem, another embodiment of the present invention provides a pressure sensor. The pressure sensor includes a lower electrode, an upper electrode, and an active layer disposed between the electrodes. The active layer includes an elastic polymer matrix, particles dispersed in the elastic polymer matrix, and an ionic liquid having a cation and an anion. The cation and the anion are bound by an intermolecular interaction on the surface of the particle to form an ionic double layer.

One of the cation and anion of the ionic liquid may be bonded to the surface of the particle by hydrogen bonding, and the other of the cation and anion of the ionic liquid may be bonded to the ion bonded on the surface of the particle by electrostatical attraction.

The elastic polymer matrix includes a thermoplastic elastic polymer, and at least a portion of the particles may be bonded to the thermoplastic elastic polymer by hydrogen bonding. The thermoplastic elastic polymer may be a thermoplastic polyurethane. The particles may be micro silica particles. The ionic liquid may include a bis(perfluorinated alkylsulfonyl)imide having a perfluorinated alkyl group having 1 to 4 carbon atoms as the anion, and imidazolium as the cation.

Regardless of each other, the upper electrode and the lower electrode may be a metal layer, a conductive metal oxide layer, a conductive carbon layer, a conductive polymer layer, or a semiconductor layer. A surface of the active layer adjacent to the upper electrode may include a flat surface, a curved surface, or a plurality of convex portions. An upper substrate disposed on an upper surface of the upper electrode and a lower substrate disposed on a lower surface of the lower electrode may be further included. In this case, at least one of the upper substrate and the lower substrate may be a flexible substrate, and among the upper electrode and the lower electrode, an electrode contacting the flexible substrate may be a flexible electrode.

In order to solve the above technical problem, another embodiment of the present invention provides a method of manufacturing a pressure sensor. First, particles and ionic liquid are mixed to obtain the ionic liquid-particle mixture in which the ionic liquid is bound by intermolecular interactions and ionic bonds on the surface of the particles. The ionic liquid-particle mixture and an elastic polymer are mixed to prepare a composite. The composite is disposed between an upper electrode and a lower electrode.

When the particles are metal oxide particles, the step of obtaining the ionic liquid-particle mixture includes providing a mixed solution of a metal oxide precursor and the ionic liquid, and generating metal oxide particles through a sol-gel reaction of the metal oxide precursor to bind the ionic liquid on the surface of the metal oxide particles by hydrogen bonds and ionic bonds. The metal oxide precursor may be silicon alkoxide, titanium (IV) alkoxide, aluminum alkoxide, or zirconium (IV) alkoxide.

Advantageous Effects

As described above, in the composite according to the embodiment of the present invention, the intermolecular interaction and binding force that binds the ionic liquid to the particles may be weakened or disconnected by the stimulation applied thereto, so that the fluidity of the ions may be changed. In addition, various sensors can be manufactured using this.

In addition, the pressure sensor according to another embodiment of the present invention includes the complex as an active layer in which the fluidity of ions is changed by stimulation, so that the difference in electrical characteristics before and after the pressure is applied increases, thereby having high sensitivity and having broad range of detectable mechanical stimuli to make possible to simulate the sensing ability of the human skin in response to physiological and mechanical stimulation.

However, the effects of the present invention are not limited to the above-mentioned effects, and other effects not mentioned will be clearly understood by those skilled in the art from the following description.

DESCRIPTION OF DRAWINGS

FIGS. 7A to 7C are schematic diagrams sequentially showing a method according to Pressure Sensor Manufacturing Example 1.

FIGS. 10, 11, and 12 are graphs showing response time, reproducibility, and durability of the pressure sensor according to Pressure Sensor Manufacturing Example 1, respectively.

MODES OF THE INVENTION

Hereinafter, exemplary embodiments of the present invention will be described in detail with reference to the accompanying drawings. The present invention may, however, be embodied in different forms and should not be construed as limited to the embodiments set forth herein. In the specification, when any element is referred to as being "on" other element, it means that the element may be formed directly on the other element, or that a third element may be interposed therebetween.

Figure 1:
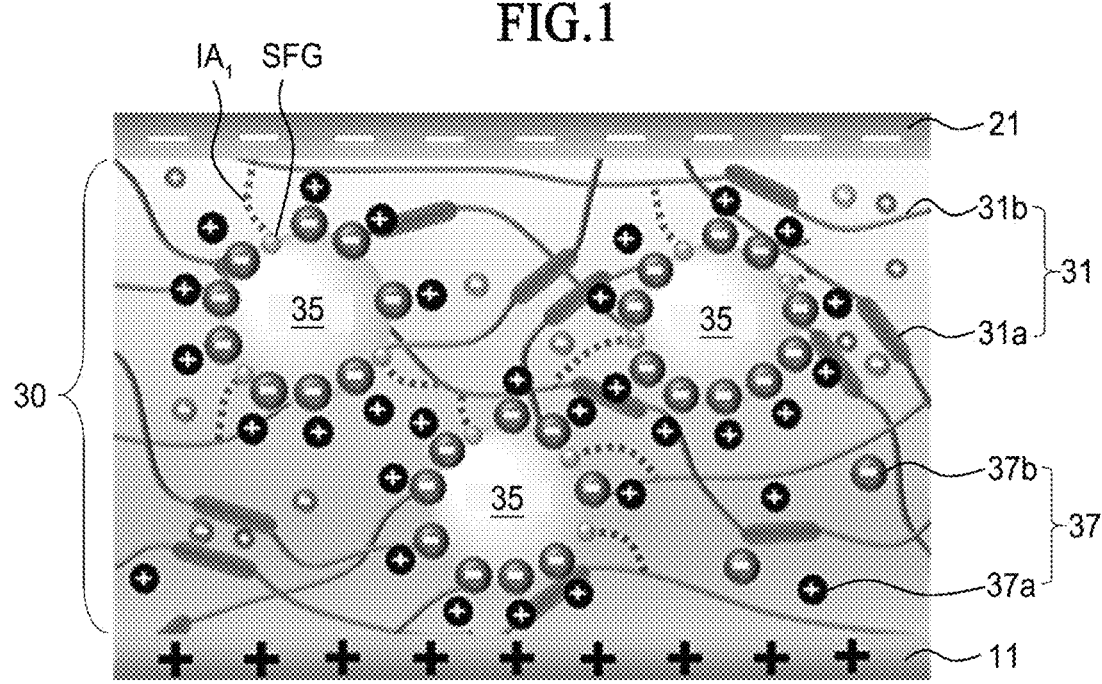
FIG. 1 is a schematic cross-sectional view of a pressure sensor according to an embodiment of the present invention.

FIG. 1 is a schematic cross-sectional view of a pressure sensor according to an embodiment of the present invention.

Referring to FIG. 1, the pressure sensor includes a lower electrode 11, an upper electrode 21, and an active layer 30 disposed therebetween.

Regardless of each other, the lower electrode 11 and the upper electrode 21 may be a metal layer, a conductive metal oxide layer, a conductive carbon layer, a conductive polymer layer, or a semiconductor layer. At least one of the lower electrode 11 and the upper electrode 21 may be a flexible electrode, for example, a metal nanowire network layer, a graphene layer, a graphite layer, or a conductive polymer layer. An upper substrate (not shown) may be disposed on the upper electrode 21, and a lower substrate (not shown) may be disposed under the lower electrode 11. These substrates may serve as supports, and may be glass substrates or polymer substrates. At least one of the upper substrate (not shown) and the lower substrate (not shown) may be a flexible substrate, and among the upper electrode 21 and the lower electrode 11, an electrode contacting the flexible substrate may be a flexible electrode. In another example, when the substrates are flexible substrates such as a polymer substrate, and the electrodes 11 and 21 are flexible electrodes, the pressure sensor may be disposed on the surface of an object having a curved surface.

The active layer 30 may include an elastic polymer matrix. Particles 35 and an ionic liquid 37 having a cation 37a and an anion 37b may be dispersed in the elastic polymer matrix. The active layer 30 may be referred to as a composite, dielectric, or solid electrolyte.

The elastic polymer matrix may contain the elastic polymer 31 to impart viscoelasticity to the active layer 30. The elastic polymer may be, for example, polyisoprene, polybutadiene, polyisobutylene, or polyurethane. Preferably, the elastic polymer may be a thermoplastic elastomer that is a block copolymer of the hard segment 31a and the soft segment 31b. The thermoplastic elastomer (TPE) may be a polystyrene-based, polyolefin-based, polyester-based, polyurethane-based, or polyamide-based TPE classified according to the type of hard segment. As an example, polystyrene-based TPE, that is, thermoplastic polystyrene, may be styrene-butadiene-styrene (SBS), styrene-polyisoprene-styrene (SIS), or styrene-polyethylene/polybutylene-styrene (SEBS) having polystyrene as the hard segment and having polybutadiene, polyisoprene, or polyethylene/polybutylene as the soft segment. Polyester-based TPE may have an aromatic polyester as the hard segment and have an aliphatic polyether or an aliphatic polyester as the soft segment. Polyurethane-based TPE may have an aromatic polyurethane as the hard segment and have an aliphatic polyether or an aliphatic polyester as the soft segment. Polyamide-based TPE may have an aromatic polyamide as the hard segment and have an aliphatic polyether or an aliphatic polyester as the soft segment. Among the thermoplastic elastomers, polyester-based, polyurethane-based, or polyamide-based TPE having a functional group capable of hydrogen bonding in the soft segment may be used.

The particles 35 may have a surface functional group (SFG) on the surface. The surface functional group (SFG) may be a surface functional group capable of hydrogen bonding, for example, a functional group having O, S, N, or F. The surface functional group (SFG) may be, for example, —OH, —COOH, —NH$_2$, —F, —CN, —SH, and the like, but is not limited thereto. The particle 35 may be an organic particle, an inorganic particle, or an organic/inorganic composite particle, and may be a particle that naturally has the surface functional group (SFG) or has undergone a surface modification process to have the surface functional group (SFG).

As an example, the particle 35 may be an metal particle, metal oxide particle, polymer particle, carbon particle, or a particle containing two or more of them. In some cases, the particle 35 may have a core-shell shape. The particle 35 may be a particle having a nano- or micro-sized diameter, and may have a spherical shape as an example, but are not limited to the spherical shape. In addition, the particle 35 may be an aggregate of primary particles. Specifically, the particle 35 may have a diameter of several tens of nanometers to several hundreds of micrometers, for example, several to several tens of μM, specifically about 1 to 20 μM, and more specifically about 5 to 10 μm.

The metal particles may be gold, silver, copper, platinum, palladium, or ruthenium particles, and ligands used for surface modification of the metal particles may be surface functional groups (SFG) having thiol group (—SH), carboxyl group (—COOH) and the like for coordinating bonds with the metal particles and having N, O, S, or F for hydrogen bonding.

Figure 2:
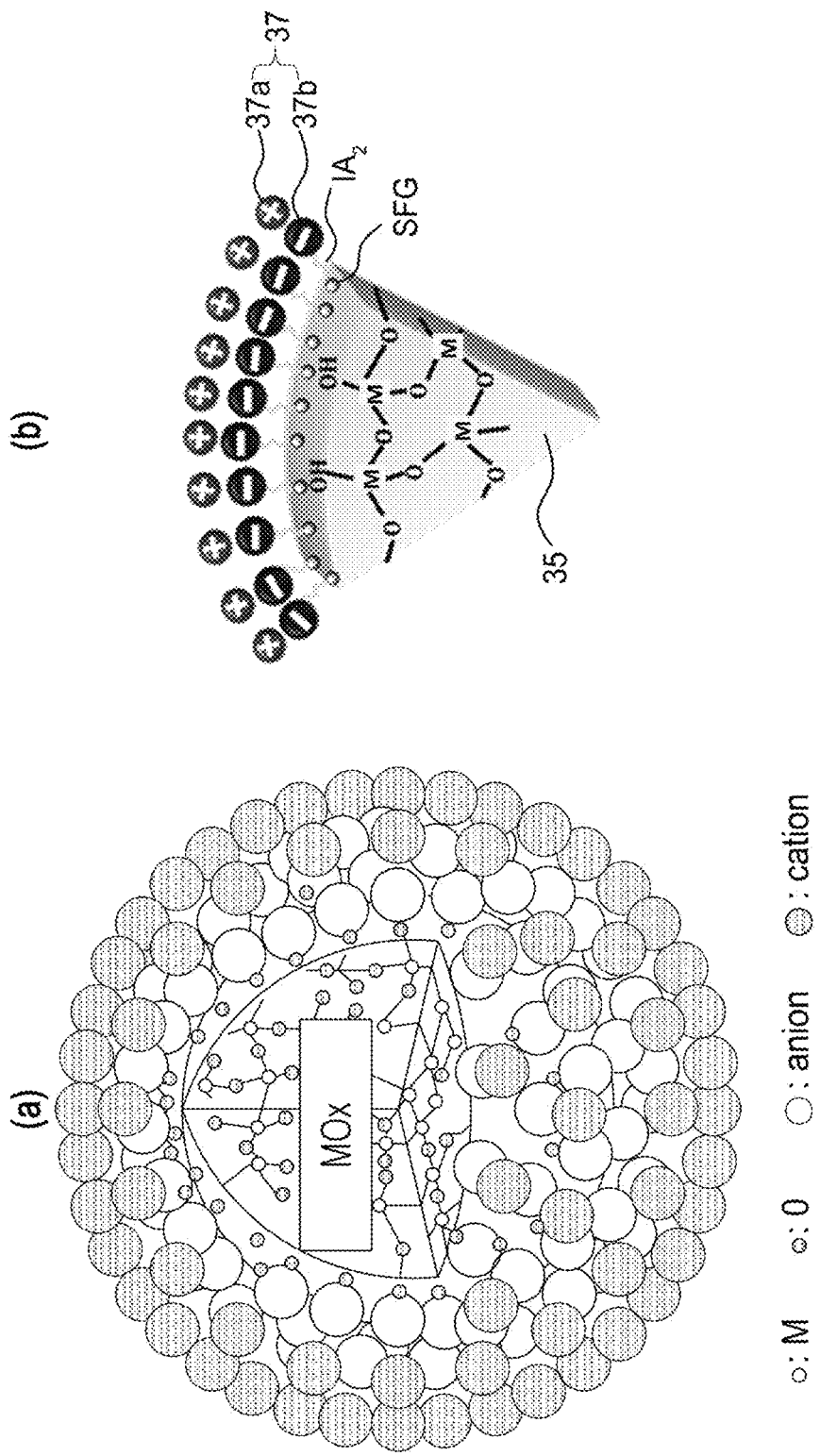
FIG. 2 is a conceptual partial cross-sectional view showing an enlarged view of the metal oxide particle shown in FIG. 1.

In one example, the particles 35 may be metal oxide particles having a hydroxyl group as a surface functional group (SFG). FIG. 2 is a conceptual partial cross-sectional view showing an enlarged view of the metal oxide particle. The metal oxide particles shown in (a) of FIG. 2 are partially cut off, and an exemplary cross-section of a piece cut from the metal oxide particles shown in (a) is shown in (b).

Referring to FIG. 2, the metal oxide particle may have a network structure having an M-O-M bond as a main skeleton, and may be silica, titania, alumina, or zirconia as an example. The metal oxide particle may have porosity, and in this case, a hydroxyl group may be located on the surface of the pores of the porous metal oxide particles. The metal oxide particle may have a diameter of micrometers, for example, about several to several tens of μm, specifically about 1 to 20 μm, and more specifically about 5 to 10 μm.

Referring back to FIG. 1, a part of the elastic polymer 31 may be bound to the surface functional group (SFG) of the particle 35 by an interaction (IA$_1$), that is, an intermolecular interaction, for example hydrogen bonding. When the elastic polymer 31 is a thermoplastic elastic polymer that is a block copolymer of the hard segment 31a and the soft segment 31b, the surface functional group (SFG) on the surface of the particle 35 may be hydrogen bonded (IA$_1$) to at lease one of the hard segment 31a and the soft segments 31b, for example, the soft segment 31b. Accordingly, the particles 35 may be attached to the elastic polymer 31. In addition, the particles 35 may be almost uniformly dispersed in the elastic polymer matrix.

The ionic liquid 37 may be a salt in which the cation 37a and the anion 37b are bound by an ionic bond, and may mean a material that is in a liquid state and has fluidity below about 100° C. specifically at room temperature.

Any one of the cation 37a and the anion 37b of the ionic liquid 37 can be confined or fixed by an interaction (IA$_2$), that is, the intermolecular interaction, with the surface functional group (SFG) of the particle 35. In addition, the other of the cation 37a and the anion 37b of the ionic liquid 37 may be confined or bound by ionic bonding to ions confined or fixed on the surface of the particles 35. As a result, pairs of the cation 37a and the anion 37b are confined on the surface of the particles 35 to form an ionic double layer.

When the surface functional group SFG is a functional group capable of hydrogen bonding, for example, a surface functional group having O, S, N, or F, the interaction IA$_2$ may be a hydrogen bond. Specifically, any one of the cation 37a and the anion 37b having N, O, S, or F in the molecule thereof, and may form hydrogen bond IA$_2$ to the surface functional group SFG located on the surface of the particle 35, thereby being confined or fixed on the surface of the particle 35. As an example, the anion 37b among the cation 37a and the anion 37b has N, O, S, or F in its molecule and is confined on the surface of the particle 35 by hydrogen bonding $IA_2$, and the cation 37a is confined to the anion 37b by an ionic bond, thereby forming the ionic double layer on the surface of the particle 35.

Meanwhile, the ionic liquid 37 that is not immobilized or constrained on the surface of the particles 35, that is, some of the cations 37a and the anions 37b may be disposed between hard segments 31a of the elastic polymer 31 or may maintain fluidity within the active layer 30. However, almost all of the cations 37a and the anions 37b may be in a confined state on the surface of the particles 35, and, compared to those, a very small amount of cations 37a and anions 37b may be disposed between the hard segment 31a or maintain fluidity within the active layer 30.

The anion 37b having N, O, S, or F in its molecule may be at least one anion selected from the group consisting of carboxylate, carbonate, phosphate, sulfonate, sulfate, cyanate, imide, bis(sulfonyl)imide, dicyanamide, hexafluoroantimonate, hydroxide, nitrite, and tetrafluoroborate. Furthermore, the anion may be a fluorinated anion containing fluorine in the molecule.

The carboxylate anion may be acetate, aminoacetate, benzoate, lactate, thiosalicylate, or trifluoroacetate. The carbonate anion may be hydrogen carbonate or methyl carbonate. The phosphate anion may be dibutyl phosphate or hexafluorophosphate. The sulfonate anion may be heptadecafluorooctanesulfonate, methane sulfonate, nonafluorobutanesulfonate, trifluoromethanesulfonate, or tosylate. The sulfate anion may be hydrogen sulfate, 2-(2-methoxyethoxy)ethyl sulfate, methyl sulfate, or octyl sulfate. The cyanate anion may be thiocyanate, and the imide anion may be succinimide. The bis(sulfonyl)imide may be represented by the following Formula 1:

[Formula 1]

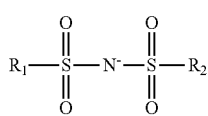

In Formula 1, each of $R_1$ and $R_2$ may be fluorine or a fluorinated alkyl group having 1 to 4 carbon atoms, regardless of each other. The fluorinated alkyl group may be a perfluorinated alkyl group.

The bis(sulfonyl)imide may be a bis(perfluorinated alkylsulfonyl)imide having a perfluorinated alkyl group having 1 to 4 carbon atoms, for example, bis(fluoromethylsulfonyl)imide (FSI), bis(trifluoromethylsulfonyl)imide (TFSI), bis(pentafluoroethylsulfonyl)imide (BETI), or (nonafluorobutylsulfonyl) (trifluoromethylsulfonyl) imide (IM14).

The cation of the ionic liquid 37 may be at least one cation selected from the group consisting of ammonium, choline, imidazolium, phosphonium, pyridinium, pyrazolium, pyrrolidinium, piperidinium, morpholinium, and sulfonium. When the cation is imidazolium, pyridinium, pyrazolium, or the like having a pi bond in the molecule, a binding force due to pi-pi bonds may exist between the cations.

The ammonium may be quaternary ammonium, which is an ammonium having four groups among alkyl groups having 1 to 20 carbon atoms regardless of each other, for example, butyl trimethyl ammonium, tributyl methyl ammonium, triethyl methyl ammonium, ethyl dimethyl propyl ammonium, 2-hydroxyethyl-trimethyl ammonium, tri(2-hydroxyethyl) methyl ammonium, methyl trioctadecyl ammonium, methyl trioctyl ammonium, tetramethyl ammonium, tetraethyl ammonium, tetrabutyl ammonium, tetrapentyl ammonium, tetrahexyl ammonium, tetraheptyl ammonium, tetraoctyl ammonium, tetradecyl ammonium, tetradodecyl ammonium, or tetrahexadecyl ammonium.

The imidazolium may be 1-allyl-3-methyl imidazolium, 1-benzyl-3-methyl imidazolium, 1,3-bis(cyanomethyl) imidazolium, 1,3-bis(cyanopropyl) imidazolium, 1-butyl-2,3-dimethyl imidazolium, 1-butyl-3-methyl imidazolium, 1-butyl-3-(3,3,4,4,5,5,6,6,7,7,8,8,8-tridecafluorooctyl) imidazolium, 1-(3-cyanopropyl)-3-methyl imidazolium, 1-decyl-3-methyl imidazolium, 1,3-diethoxy imidazolium, 1,3-dimethoxy imidazolium, 1,3-dihydroxy imidazolium, 1,3-dihydroxy-2-methoxy imidazolium, 1,3-dimethoxy-2-methyl imidazolium, 1,3-dimethyl imidazolium, 1,2-dimethyl-3-propyl imidazolium, 1-dodecyl-3-methyl imidazolium, 1-ethyl-2,3-dimethyl imidazolium, 1-ethyl-3-methyl imidazolium, 1-hexyl-3-methyl imidazolium, 1-(2-hydroxyethyl)-3-methyl imidazolium, 1-methyl imidazolium, 1-methyl-3-octyl imidazolium, 1-methyl-3-propyl imidazolium, 1-methyl-3-(3,3,4,4,5,5,6,6,7,7,8,8,8-tridecafluorooctyl) imidazolium, 1-methyl-3-vinyl imidazolium, or 1,2,3-trimethyl imidazolium.

The phosphonium may be tetrabutyl phosphonium, tributyl methyl phosphonium, triethyl methyl phosphonium, or trihexyl tetradecyl phosphonium. The pyridinium may be 1-butyl-3-methyl pyridinium, 1-butyl-4-methyl pyridinium, 1-butyl pyridinium, 1-(3-cyanopropyl) pyridinium, 1-ethyl pyridinium, or 3-methyl-1-propyl pyridinium. The pyrrolidinium may be 1-butyl-1-methyl pyrrolidinium or 1-ethyl-1-methyl pyrrolidinium. The pyrazolium may be 1,2,4-trimethylpyrazolium. The sulfonium may be triethyl sulfonium. The piperidinium may be 1-butyl-1-methyl piperidinium or 1-ethyl-1-methyl piperidinium. The morpholinium may be 4-ethyl-4-methyl morpholinium.

In one embodiment, the ionic liquid 37 may be $[EMIM]^+$ $[TFSI]^-$ (EMIM: 1-Ethyl-3-Methyl IMidazolium, TFSI: bis(TriFluoromethylSulfonyl)Imide).

The pressure sensor according to the present embodiment may partially simulate a tactile receptor in a living body. Specifically, there are Merkel cell, Meissner's corpuscle, Pacinian corpuscle, and the like as tactile receptors in the living body, and these may be located in the dermis together with an extracellular matrix. The active layer 30 of the pressure sensor according to the present embodiment corresponds to the dermis of a living body, and the elastic polymer 31 corresponds to an extracellular matrix having viscoelasticity, specifically, a collagen fiber having a network structure (reticular) and a flexible property (elastic). The particle 35 may correspond to a tactile receptor or a tactile cell, and the interaction $IA_1$ between the elastic polymer 31 and the particle 35 or the surface functional group SFG on the surface of the particle 35 that induces the interaction $IA_1$ may correspond to an integrin that attaches tactile cells to the extracellular matrix, specifically collagen fibers, and the double layer of anions and cations located on the surface of the particle 35 may correspond to the anions and cations that are located inside and outside the plasma membrane of tactile cells to form a membrane potential.

Hereinafter, a method of operating the pressure sensor according to the present embodiment will be described.

Referring again to FIG. 1, a voltage may be applied to the electrodes 21 and 11 of the pressure sensor. This voltage can be kept the same while the pressure sensor is operating. As an example, a negative voltage may be applied to the upper electrode 21 and a positive voltage may be applied to the lower electrode 11.

Due to the voltage applied to the electrodes 21 and 11, among the anions 37b and the cations 37a present in the active layer 30, anions 37b and cations 37a which are not constrained on the surface of the particles 35, and not disposed between the hard segments 31a of the elastic polymer 31 adjacent to each other may be attracted and moved onto the surfaces of the electrodes 21 and 11 to form an electrostatic double layer. However, the amount of the mobile anions 37b and cations 37a in the active layer 30 may be extremely small, so that the pressure sensor may exhibit an initial capacitance close to zero.

Figure 3:
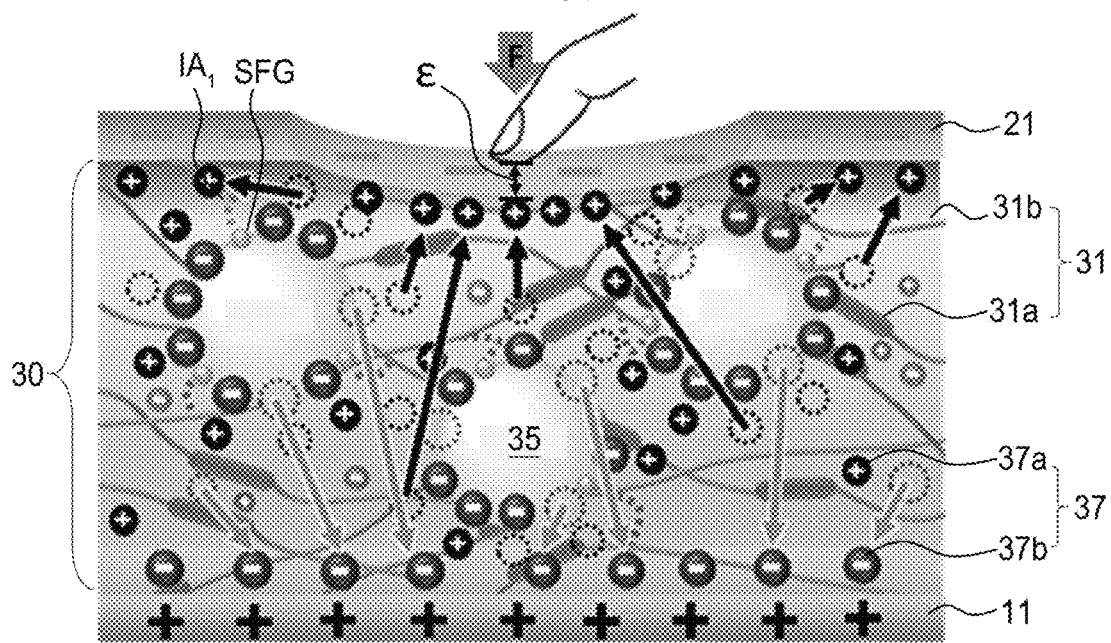
FIG. 3 is a cross-sectional view showing a state when a mechanical stimulus is applied to the pressure sensor shown in FIG. 1.
Figure 4:
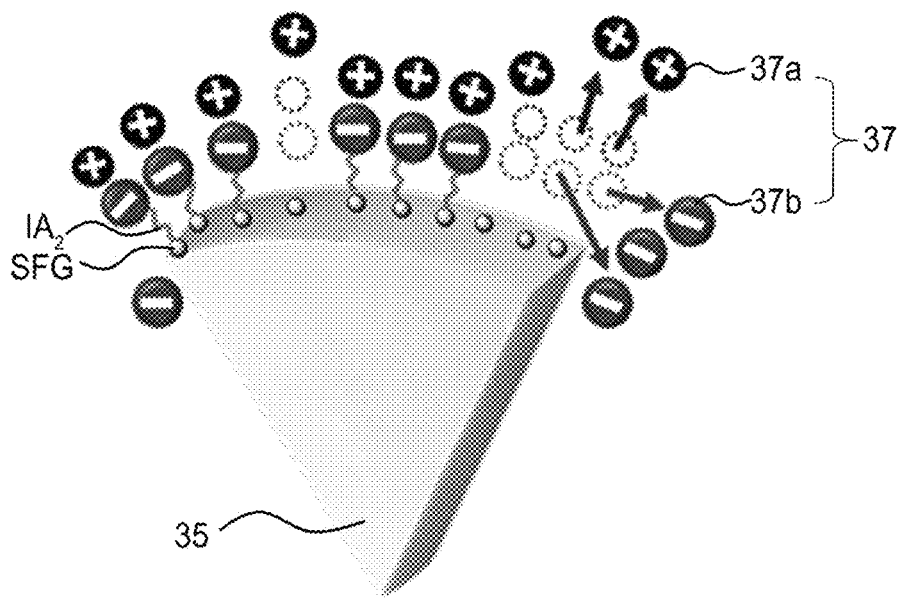
FIG. 4 is a cross-sectional view showing a partial cross section of the particle shown in FIG. 3.

FIG. 3 is a cross-sectional view showing a state when a mechanical stimulus is applied to the pressure sensor shown in FIG. 1, and FIG. 4 is a cross-sectional view showing a partial cross-section of the particle shown in FIG. 3.

Referring to FIGS. 3 and 4, when a first pressure F is applied to the pressure sensor as an example of a mechanical stimulus in a state in which a voltage as shown in FIG. 1 is applied to the electrodes 11 and 21 of the pressure sensor, the active layer 30 may be compression-deformed to generate the first strain ε. In this case, due to the compression deformation of the active layer 30, the distance between the electrodes 11 and 21 in some regions may decrease, and accordingly, the strength of the electric field between the electrodes 11 and 21 may increase. At the same time, the compression deformation of the active layer 30 may cause the positional movement of the polymer chains of the elastic polymer 31, etc., and thus, the interaction between the surface of the particle 35 and the anions 37b, for example, hydrogen bonds, the ionic bonds between the anions 37b and the cations 37a, and pi-pi bonds between cations 37a when cations 37a have pi-pi bonds, may be weakened or broken. Accordingly, some of the anions 37b and cations 37a, which have been locally constrained on the surface of the particle 35, can gain mobility, and can be moved to the electrodes 11 and 21 by the electric field between the electrodes 11 and 21 to which the voltage is applied. As a result, the density of charges accumulated in the electric double layer generated between the respective electrodes 11 and 21 and the active layer 30 becomes larger, resulting in an increase in the capacitance between the electrodes 11 and 21.

After that, in a state in which the voltage as shown in FIGS. 1 and 3 is applied to the electrodes 11 and 21 of the pressure sensor, a second pressure greater than the first pressure applied to the pressure sensor (Fi in FIG. 3) is applied. The active layer 30 may be further compressively deformed while generating a second strain greater than the first strain ε. In this case, as the electrodes 11 and 21 become more closer, the strength of the electric field between them may be stronger, and at the same time, the further compressive deformation of the active layer 30 may cause the positional movement of the particle 35 in addition to the positional movement of the polymer chains of the elastic polymer 31, and thus, this may increase the amount of weakened or broken interactions between the surface of the particle 35 and the anions 37b, for example, hydrogen bonds, and ionic bonds between the anions 37b and the cations 37a. Accordingly, some of the anions 37b and cations 37a, which have been locally constrained on the surface of the particle 35 even when the first pressure is applied as shown in FIG. 3, can gain mobility, and can be moved to the electrodes 11 and 21 by the electric field between the electrodes 11 and 21 to which the voltage is applied. As a result, the density of charges accumulated in the electric double layer generated between the respective electrodes 11 and 21 and the active layer 30 becomes larger compared to the case described with reference to FIG. 3, resulting in an additional increase in the capacitance between the electrodes 11 and 21.

As the pressure applied to the pressure sensor increases as described above, the strength of the electric field between the electrodes 11 and 21 can be increased, and at the same time, the compressive deformation of the active layer 30 becomes larger and the degree of positional movement of the metal oxide particles 35 as well as the degree of positional movement of the polymer chains of the elastic polymer 31 increase, and as a result, the number of ions gaining mobility may gradually increase as the applied pressure increases. As a result, the range of mechanical stimuli, for example the range of the pressure, that can be detected by the pressure sensor according to the present embodiment can be greatly increased.

In addition, when the pressure applied to the pressure sensor (ex. F in FIG. 3) is removed, the strain (ex. ε in FIG. 3) generated in the active layer 30 can be removed due to the viscoelastic behavior of the elastic polymer 31. Accordingly, the anions 37b and the cations 37a accumulated in the electric double layer between the respective electrodes 11 and 21 and the active layer 30 may be dispersed again into the active layer 30 to establish a concentration equilibrium in the active layer 30 and constrained again by the interaction with the particles 35, for example hydrogen bonds and ionic bonds. As a result, the pressure sensor can be restored to an initial state similar to that shown in FIG. 1.

In the active layer 30, that is, a composite, a dielectric, or a solid electrolyte, ion fluidity may be changed according to the degree of stimulation applied thereto. In other words, in the active layer 30, the intermolecular interaction and bonding force that binds the ionic liquid to the particles may be weakened or disconnected due to the stimulation applied thereto, so that the fluidity of the ions may be changed. Meanwhile, although the pressure sensor was previously described with reference to FIGS. 1 and 4, the present invention is not limited thereto, and several types of sensors can be configured to sense changes in ion fluidity due to external stimulation of the active layer 30 or the composite constituting the active layer in various ways.

Hereinafter, a method of manufacturing the pressure sensor will be described.

First, by mixing particles and an ionic liquid, the ionic liquid-particle mixture in which the ionic liquid is constrained by intermolecular interactions and ionic bonds on the surface of the particles can be obtained.

When the particles are metal oxide particles, mixing the particles and the ionic liquid may include a step of providing a mixed solution obtained by mixing a metal oxide precursor and the ionic liquid, and a step of generating metal oxide particles by sol-gel reaction of the metal oxide precursor to confine the ionic liquid on the surface of the metal oxide particles by intermolecular interactions and ionic bonds.

In this case, the metal oxide precursor is silicon, titanium, aluminum, or zirconium to which a hydroxyl group, an alkoxy group having 1, 2 or 3 carbon atoms, a halo group, or functional groups of two or more combinations thereof are bonded. As an example, the metal oxide precursor may be silicon alkoxide, titanium (IV) alkoxide, aluminum alkoxide, or zirconium (IV) alkoxide. Specifically, the metal oxide precursor may be TEOS (tetraethyl orthosilicate). In addition, the metal oxide precursor may be provided in the form of an aqueous solution, and may have an almost neutral pH. As described with reference to FIG. 1, the ionic liquid includes cations and anions, and may exist in a liquid state at 100 degrees or less.

In order to generate metal oxide particles by a sol-gel reaction in the mixed solution, as an example of a catalyst, an acid catalyst, specifically, hydrochloric acid or an aqueous hydrochloric acid solution may be added to the mixed solution. The metal oxide particles may be microparticles having a network structure made of an M-O-M bond. In the sol-gel reaction, the hydrolysis of the metal oxide precursor and the condensation reaction between the hydrolyzed metal oxide precursors occur. When the hydrolysis rate is greater than the condensation reaction rate, the porosity of the formed metal oxide particles may be reduced. In this embodiment, in order to increase the hydrolysis rate compared to the condensation reaction rate, an acid catalyst, specifically, an aqueous hydrochloric acid solution capable of exhibiting strong acidity may be used as the catalyst, but is not limited thereto. In some cases, by making the condensation reaction rate larger than the hydrolysis rate, it is possible to increase the porosity of the metal oxide particles.

In addition, as the metal oxide precursor and the ionic liquid are mixed before proceeding with the sol-gel reaction, cations and anions provided in the ionic liquid may form a relatively high-density ionic double layer confined on the surface of the metal oxide particles. As described above, in the ionic double layer, ions of the ionic liquid, for example anions, having a functional group capable of hydrogen bonding may form a hydrogen bond with a hydroxyl group on the surface of the metal oxide particles, and ions of the ionic liquid, for example the cations, which are the counter ions of the anions, may be constrained by the anions by ionic bonds.

Thereafter, a mixture comprising the metal oxide particles and an ionic liquid confined on the surface thereof, that is, a gel-like ionic liquid-metal oxide particle mixture, is mixed with an elastic polymer, specifically an elastic polymer gel, to obtain a composite. The composite can be molded to prepare an active layer. In this case, the ionic liquid may serve as a surfactant and a plasticizer. Specifically, the ionic liquid may hydrophobically modify the surface of the hydrophilic metal oxide particles by forming an ionic double layer on the surface of the hydrophilic metal oxide particles. Accordingly, the metal oxide particles may be homogeneously dispersed in the active layer formed by mixing with the hydrophobic elastic polymer gel. The residual solvent in the composite or active layer may be dried or removed.

Thereafter, a pressure sensor may be manufactured by placing the active layer between substrates having electrodes.

Figure 5:
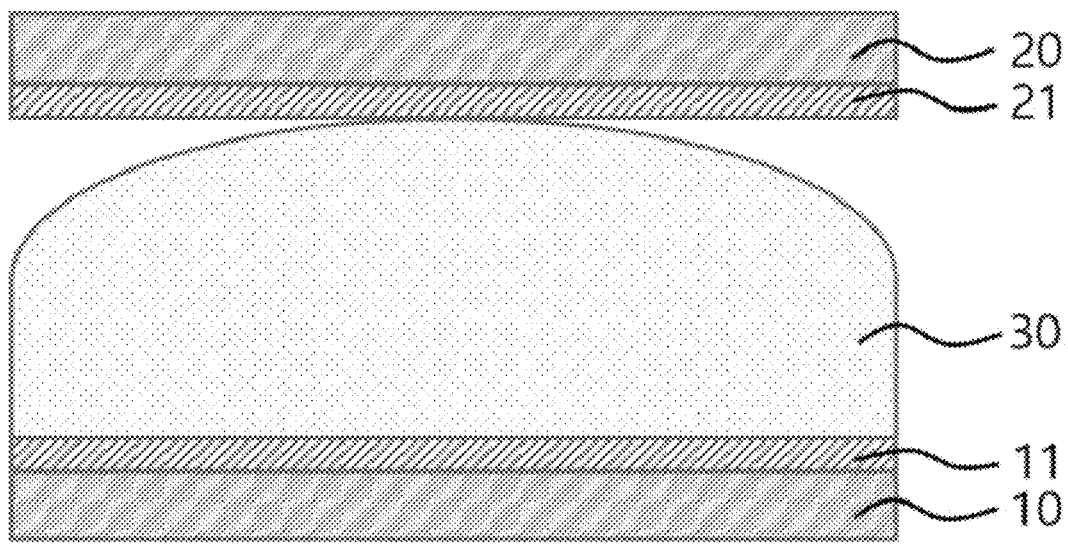
FIGS. 5 and 6 are cross-sectional views showing pressure sensors according to other embodiments of the present invention.
Figure 6:
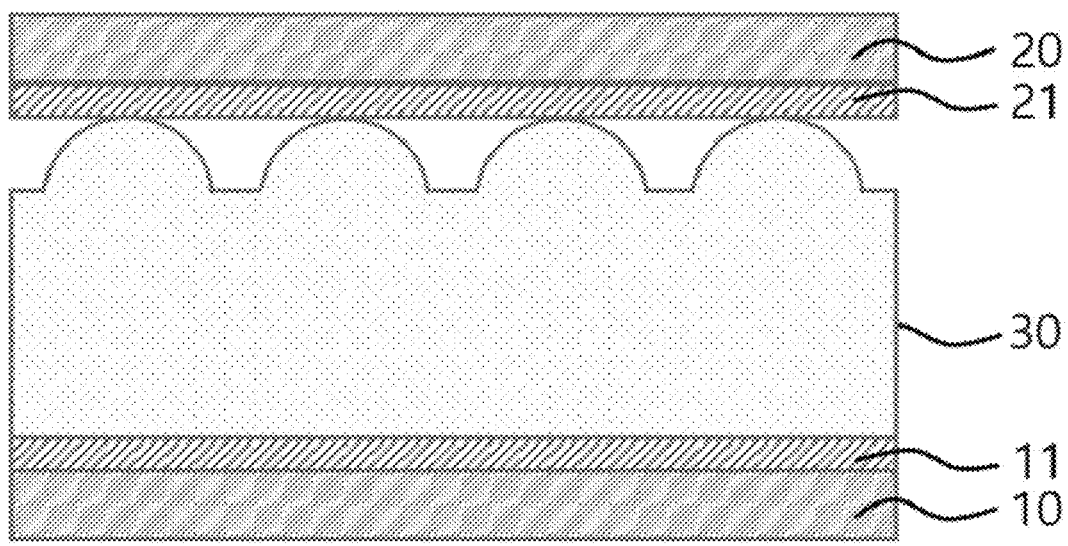

FIGS. 5 and 6 are cross-sectional views showing pressure sensors according to other embodiments of the present invention.

Referring to FIG. 5, whereas the top surface of the active layer shown with reference to FIG. 1 is a flat surface, the top surface of the active layer may have a curved surface. In this case, the contact area between the electrode and the active layer before the mechanical stimulation is applied may be smaller than after the mechanical stimulation is applied, and the contact area between the electrode and the active layer may gradually increase as the magnitude of the mechanical stimulation increases. Due to this, the sensitivity of the pressure sensor can be further improved.

Referring to FIG. 6, the upper surface of the active layer may include a plurality of curved convex portions. In this case, as described with reference to FIG. 5, the sensitivity of the pressure sensor may be improved.

The pressure sensor presented in the embodiments of the present invention may be applied to a pressure/touch sensor, in particular, a soft pressure/touch sensor for a shape-variable display; a patch-type sensor for biometric monitoring; a pressure sensor of a wearable haptic device; an electronic skin such as robotic skin and prosthetic medical devices, and the like.

Hereinafter, experimental examples are presented to aid the understanding of the present invention. However, the following experimental examples are only intended to aid understanding of the present invention, and the present invention is not limited by the following experimental examples.

<Pressure Sensor Manufacturing Example 1>

Figure 7B:
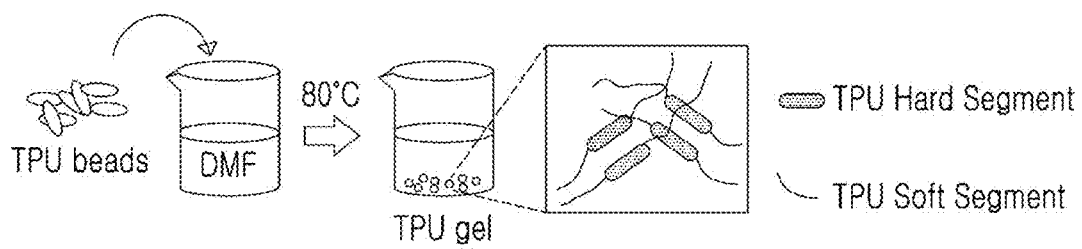
Figure 7C:
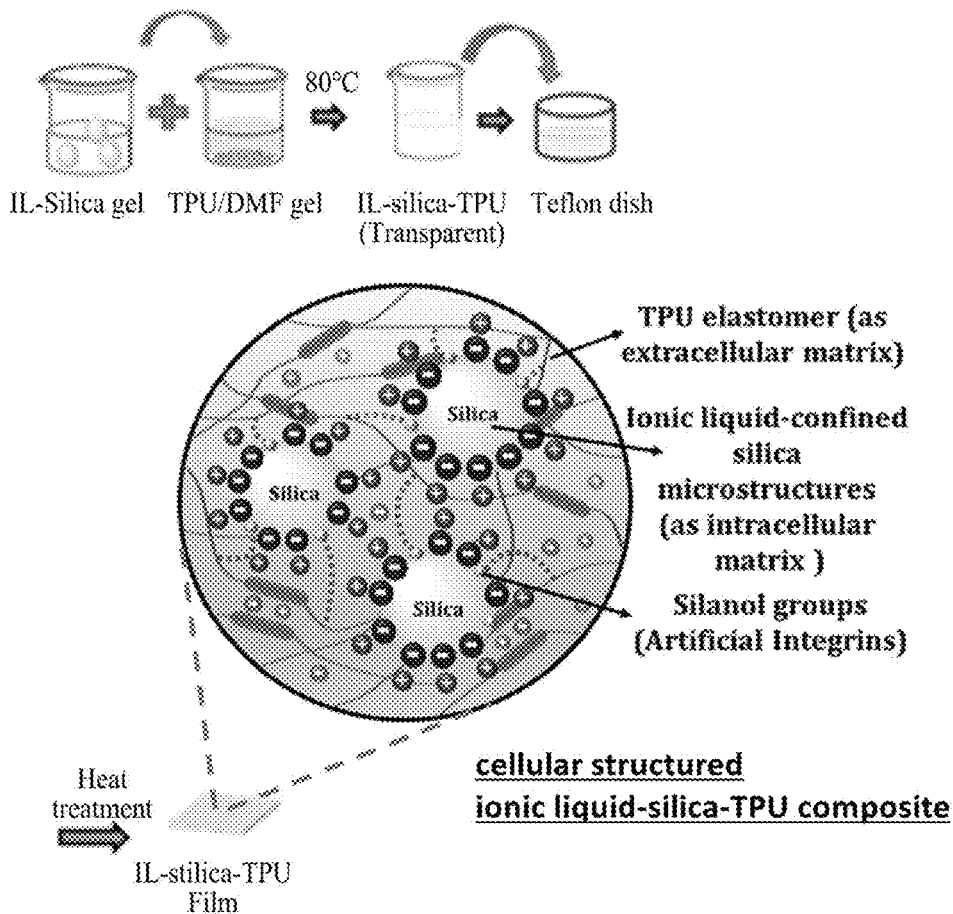

FIGS. 7A to 7C are schematic diagrams sequentially showing a method according to Pressure Sensor Manufacturing Example 1.

Step 1: Preparation of IL-Silica Particles Through Sol-Gel Reaction

Referring to FIG. 7A, TEOS (tetraethyl orthosilicate, Sigma-Aldrich) and water were mixed at a molar ratio of 1:6 and stirred at 40° C. for 10 minutes to obtain an aqueous TEOS solution (pH=7). An appropriate amount of [EMIM]$^+$ [TFSI]$^-$ (1-Ethyl-3-MethylIMidazolium bis(TriFluoromethylSulfonyl)Imide), which is an ionic liquid (IL), was added dropwise to the TEOS aqueous solution and stirred for 10 minutes. The molar ratio of TEOS:water:IL was 1:6:0.9. While continuously stirring this, 0.05 ml of an aqueous hydrochloric acid solution (0.06M) was added dropwise, and the obtained solution (pH=2) was continuously stirred at 40° C. for 2 hours to obtain a uniform dispersion of IL-silica particles.

Step 2: Preparation of Thermoplastic Polyurethane Solution

Referring to FIG. 7B, TPU beads (thermoplastic polyurethane, KA-480, Kolon Industries, Inc.) were added to N,N-dimethyl formamide (DMF, Sigma-Aldrich) at a mass ratio of 1:5 and dissolved by continuous stirring at 80° C. for 3 hours to prepare TPU solution.

Step 3: Preparation of IL-Silica-TPU Three-Component Solution

Referring to FIG. 7C, while continuously stirring the TPU solution obtained in step 2 at 80° C., the IL-silica particle dispersion obtained in step 1 was added dropwise, and the resulting transparent suspension was stirred at 80° C. for 20 hours.

Step 4: Preparation of a Composite Film of Three Components of IL-Silica-TPU

Still referring to FIG. 7C, a predetermined amount of the IL-silica-TPU solution obtained in step 3 was poured into a Teflon dish at 40° C., the temperature was raised by 10° C. per hour, and heat treated at 80° C. for 72 hours to prepare composite film of a thickness of about 170 μm.

Step 5: Manufacture the Pressure Sensor

The composite film having a thickness of 170 μm and an area of 0.7 cm$^2$ obtained in step 4 was placed between glass substrates coated with ITO (Indium Tin Oxide) electrodes on the surface, and silver wires (Nilaco, Diameter: 50 μm) were applied to the ITO electrodes to prepare a pressure sensor.

<Pressure Sensor Manufacturing Example 2>

A pressure sensor was manufactured using the same method as in Pressure Sensor Manufacturing Example 1, except that step 5 of Pressure Sensor Manufacturing Example 1 was performed as follows.

First, the Ag nanowire electrode layer was prepared by the following method. Ag nanowire suspension (Nanopyxis, 0.5% by weight in isopropyl alcohol, the diameter of the Ag nanowire is about 32±5 nm and the length is 25±5 μm) was diluted with isopropyl alcohol to prepare diluted Ag nanowire solution having 0.25 mg/ml concentration. A PDMS substrate was prepared by curing a mixture of a base resin and a crosslinking agent (mass ratio 10:1, Dow corning corp., Sylgard 184) in a plastic Petri dish. After degassing and curing in an oven at 80° C. for 2 hours, the PDMS substrate was cut into a desired size. After sonicating the diluted Ag nanowire solution for about 1 hour, the Ag nanowire solution was spray coated (SRC-200 VT, E-FLEX Korea, nozzle 0.05 mm, injection pressure 200 mbar) on the patterned PDMS substrate heated to 100° C. and then annealed at 120° C. for 1 hour to prepare a substrate coated with an Ag nanowire electrode layer (0.5 cm×0.5 cm).

The composite film (170 μm thickness, 0.5 cm×0.5 cm) obtained in step 4 was placed between the two substrates each coated with the Ag nanowire electrode layer prepared from the above, and silver wires (Nilaco, Diameter: 50 μm) were connected to the electrodes to prepare a pressure sensor.

<Pressure Sensor Comparative Example>

A pressure sensor was manufactured using the same method as in Pressure Sensor Manufacturing Example 1, except that, in Step 2 of Pressure Sensor Manufacturing Example 1, instead of using the IL-silica particle dispersion obtained in Step 1, [EMIM]$^+$[TFSI]$^-$ (1-Ethyl-3-MethylIMidazolium bis(TriFluoromethylSulfonyl)Imide) which has the same amount used in Step 1 without silica particles was used.

Figure 8:
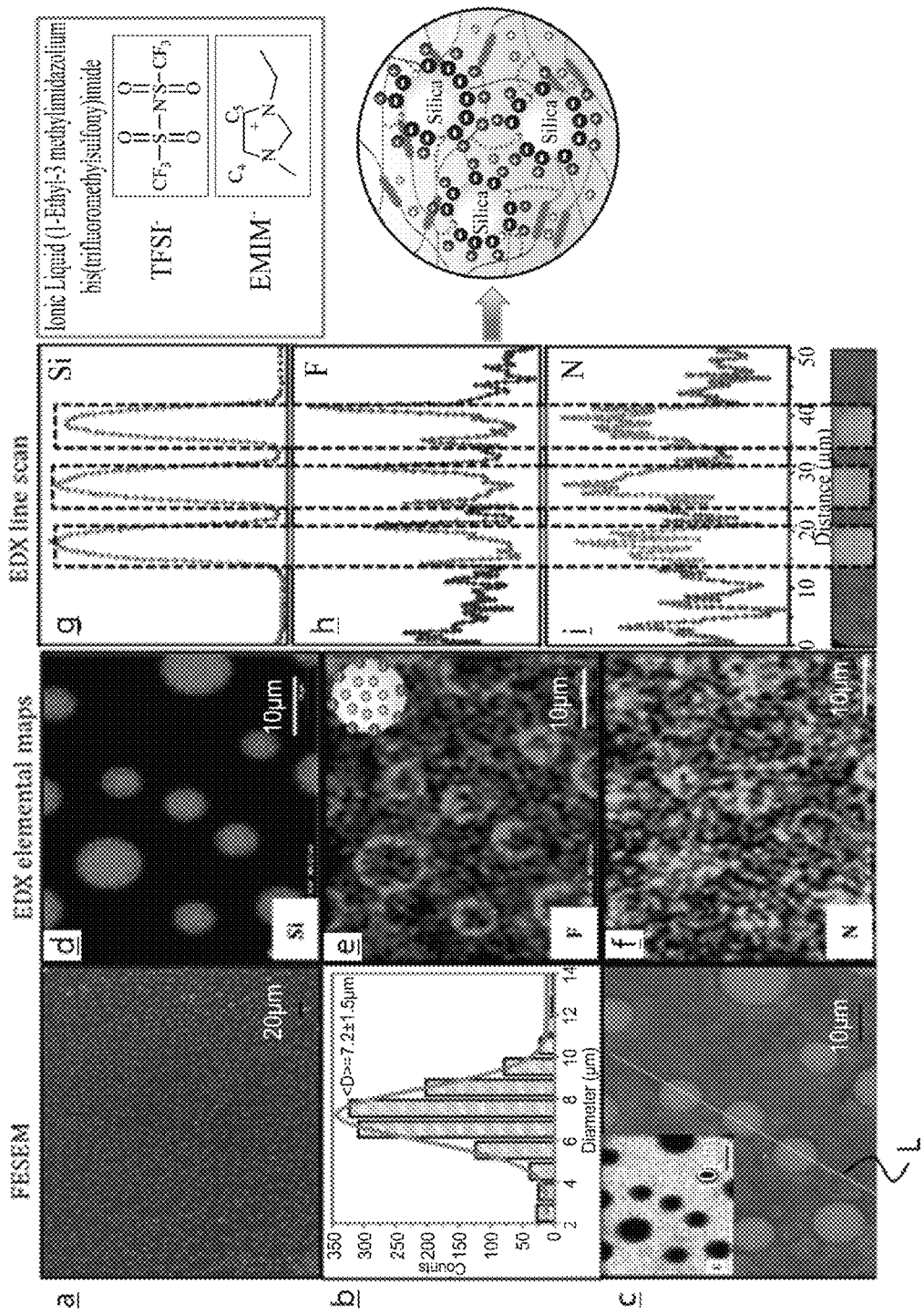
FIG. 8 shows the results of analyzing the IL-silica-TPU composite film obtained in Step 4 of Pressure Sensor Manufacturing Example 1 through a field effect scanning electron microscope (FE-SEM) and an energy dispersive X-ray spectroscopy (EDS).

FIG. 8 shows the results of analyzing the IL-silica-TPU composite film obtained in Step 4 of Pressure Sensor Manufacturing Example 1 through a field effect scanning electron microscope (FE-SEM) and an energy dispersive X-ray spectroscopy (EDS). Specifically, (a) and (c) are FE-SEM (JSM-6700F, JEOL) images taken at low and high magnification, respectively, and (b) is a graph showing the diameter distribution of particles shown in the FE-SEM image of (a). An inset in (c), (d), (e), and (f) are EDS (QUANTAX EDX) images displayed by detecting elements, i.e., carbon (C), silicon (Si), fluorine (F), and nitrogen (N) contained in the sample photographed in (c), respectively. (g), (h), and (i) are graphs showing the relative content of elements, i.e., silicon (Si), fluorine (F), and nitrogen (N) located in the line (L) of the sample by scanning along the line (L) of (c).

Referring to FIG. 8, it can be seen that particles in the IL-silica-TPU composite film, that is, silica particles are uniformly dispersed in the film (a), and the particles have diameters of about 2 to 14 μm, specifically 7.2±1.5 μm.

In addition, it was found that the particles in the IL-silica-TPU composite film contained Si, F, and N, and the matrix other than the particles contained C, F, and N (inset in (c), (d), (e), and (f)). In the matrix, it is assumed that C contained is derived from polyurethane, N is derived from polyurethane and [EMIM]$^+$, and F is derived from [TFSI]$^-$. In the particle surface, it is assumed that Si is derived from silica, and N is from polyurethane and [EMIM]$^+$, and F is derived from [TFSI]$^-$.

Figure 9A:
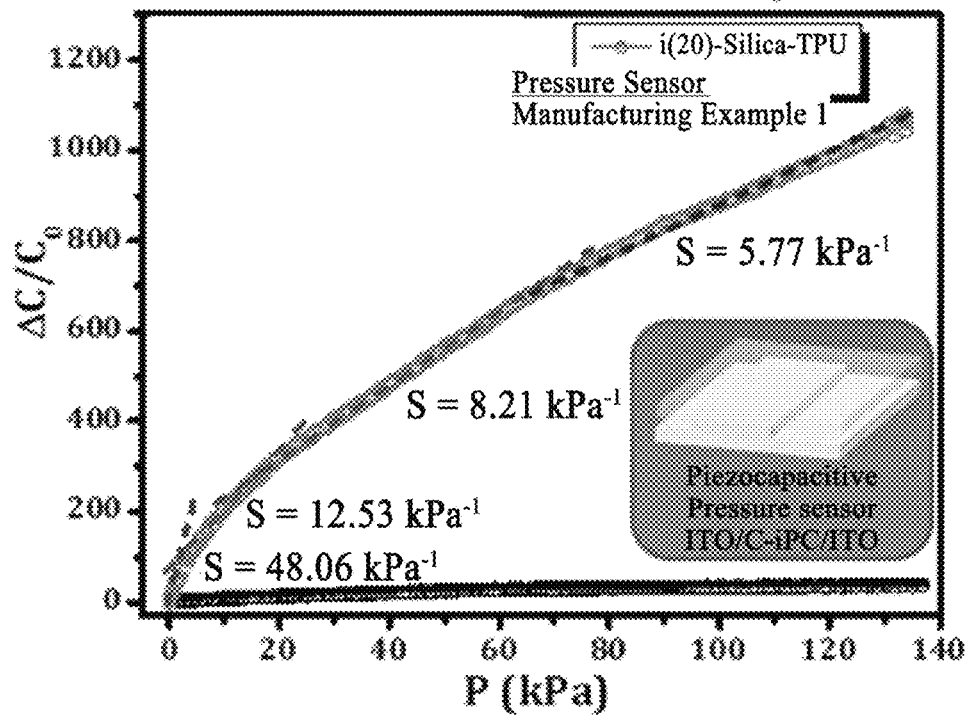
FIGS. 9A and 9B are graphs showing the relative capacitance change with respect to the pressure applied to the pressure sensors according to Pressure Sensor Manufacturing Example 1 and Pressure Sensor Comparative Example, respectively.
Figure 9B:
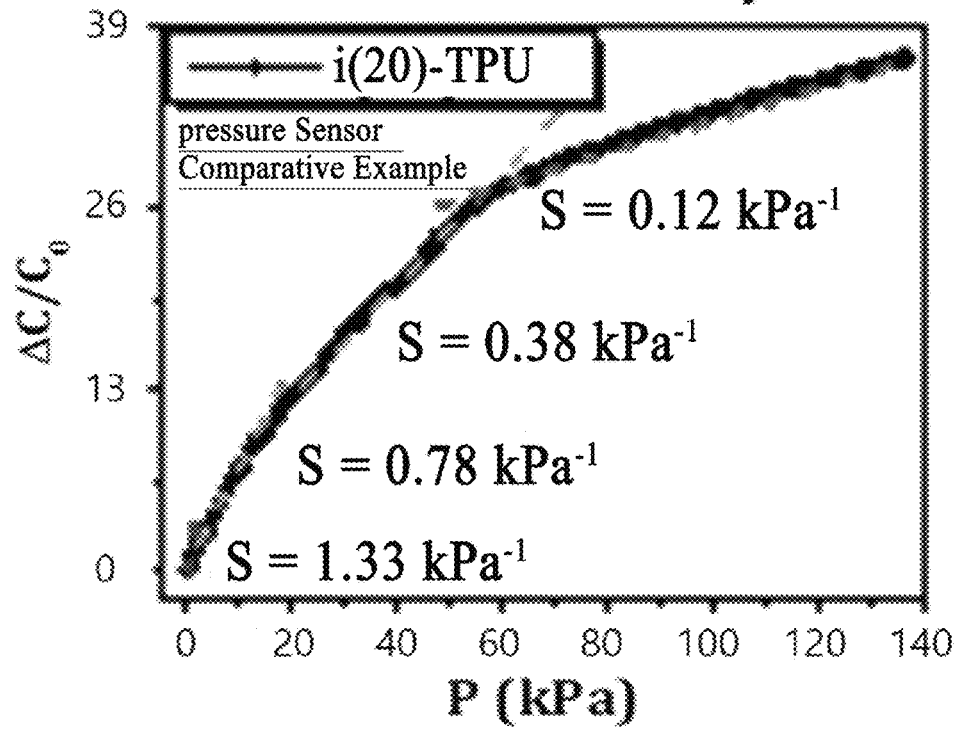

FIG. 9A is a graph showing the relative capacitance change with respect to the pressure applied to the pressure sensors according to Pressure Sensor Manufacturing Example 1, and FIG. 9B is a graph showing the relative capacitance change with respect to the pressure applied to the pressure sensors according to Pressure Sensor Comparative Example. This capacitance was measured at room temperature.

Referring to FIGS. 9A and 9B, it can be seen that the pressure sensor according to Pressure Sensor Manufacturing Example 1 exhibits a larger amount of relative capacitance change ($\Delta C/C^0$) at the same pressure as compared to the pressure sensor according to Pressure Sensor Comparative Example. In addition, in this graph, the slope ($S=\delta(\Delta C/C^0)/\delta P$) represents the sensitivity of the pressure sensor. Looking at this, it can be seen that the pressure sensor according to Pressure Sensor Manufacturing Example 1 exhibits a larger slope, i.e., better sensitivity compared to the pressure sensor according to Pressure Sensor Comparative Example in a similar pressure range.

FIGS. 10, 11, and 12 are graphs showing response time, reproducibility, and durability of the pressure sensor according to Pressure Sensor Manufacturing Example 1, respectively.

Referring to FIG. 10, in the pressure sensor according to Pressure Sensor Manufacturing Example 1, when the applied pressure is increased from an initial pressure of 170 Pa to 340 Pa, a change in relative capacitance appears within about 60 ms, and when the applied pressure is reduced from 340 Pa to 170 Pa, a change in the relative capacitance appears within about 70 ms. Accordingly, it can be seen that the pressure sensor responds within a very short response time.

Referring to FIG. 11, the pressure sensor according to Pressure Sensor Manufacturing Example 1 exhibits the same type of relative capacitance change in 5 repeated experiments at each pressure of 1.5 kPa, 12.4 kPa, 61.9 kPa, and 100.1 kPa. From this, it can be seen that the reproducibility is very good in the pressure range of 1 to 100 kPa.

Referring to FIG. 12, it can be seen that the pressure sensor according to Pressure Sensor Manufacturing Example 1 exhibits good durability in both the case of performing 100 cycles at 4.6 kPa and 100 cycles at 12.1 kPa. Here, as shown in FIG. 10, the unit cycle is configured to maintain the applied pressure for 10 seconds after applying the pressure, and maintain the state in which the pressure has been removed for 10 seconds.

Figure 13A:
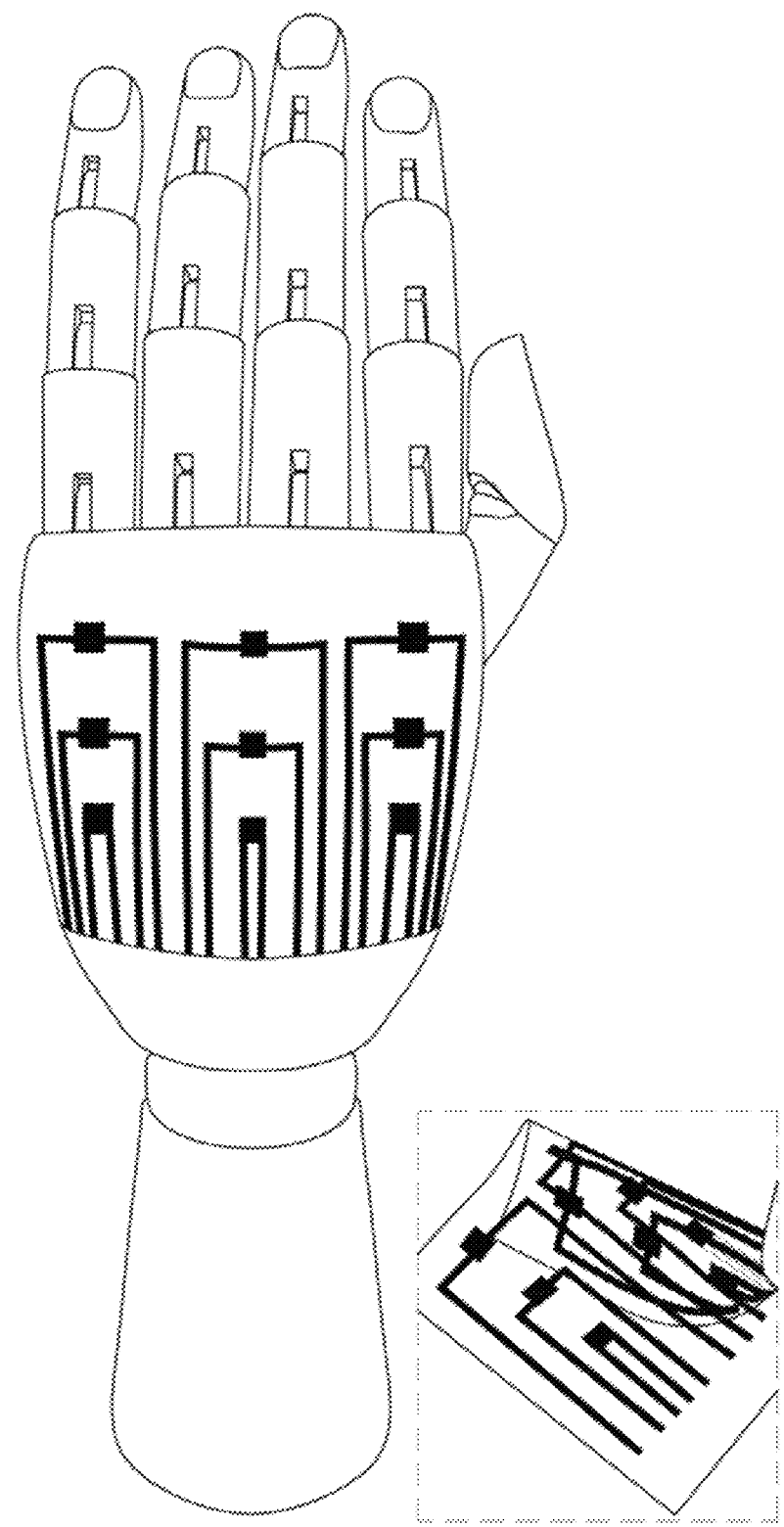
FIG. 13A shows a photograph of nine pressure sensors according to the Pressure Sensor Manufacturing Example 2 configured as a 3×3 sensing array patch-type pressure sensor and pasted on a dummy hand.

FIG. 13A shows a photograph of nine pressure sensors according to the Pressure Sensor Manufacturing Example 2 configured as a 3×3 sensing array patch-type pressure sensor and pasted on a dummy hand.

Figure 13B:
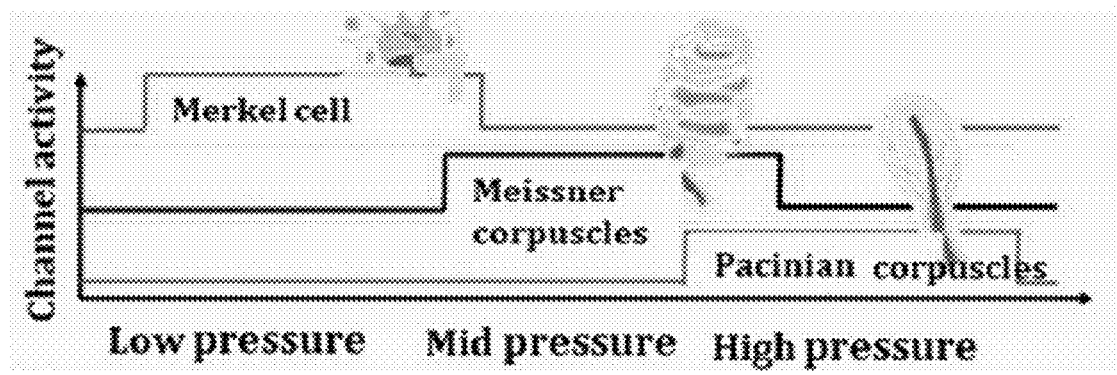
FIG. 13B shows a graph showing the pressure perception ranges of various pressure receptors of human skin.

FIG. 13B shows a graph showing the pressure perception ranges of various pressure receptors of human skin.

Figure 13C:
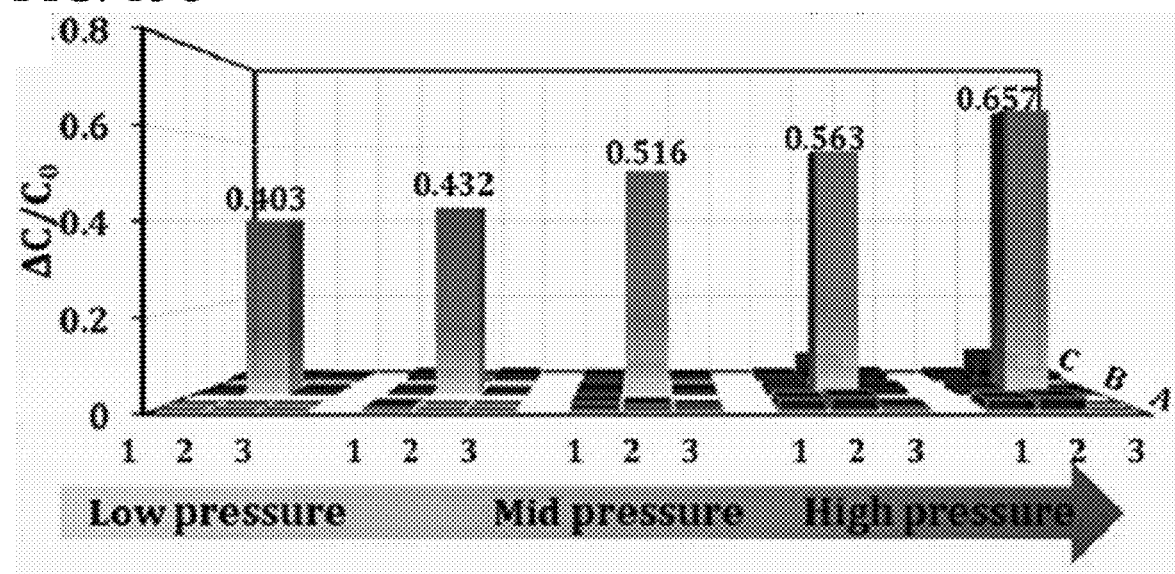
FIG. 13C shows a graph showing the relative capacitance change with respect to the pressure applied to the 3×3 sensing array patch-type pressure sensor.

FIG. 13C shows a graph showing the relative capacitance change with respect to the pressure applied to the 3×3 sensing array patch-type pressure sensor.

Referring to FIGS. 13A-C, various tactile receptors in human skin, that is, Merkel cells, Meissner corpuscle, and Pacinian corpuscle have different ranges of recognizable pressure, whereas it can be seen that the unit pressure sensor according to Pressure Sensor Manufacturing Example 2 effectively senses the pressure within all the pressure ranges that the tactile receptors can recognize. In this way, by effectively sensing a broadband dynamic stimulus that can be sensed in cooperation with various tactile receptors in human skin with one type of pressure sensor according to an embodiment of the present invention, it can be seen that with only one type of pressure sensor according to an embodiment of the present invention, it is possible to simulate the sensing ability for physiological and mechanical stimulation of human skin.

Figure 14:
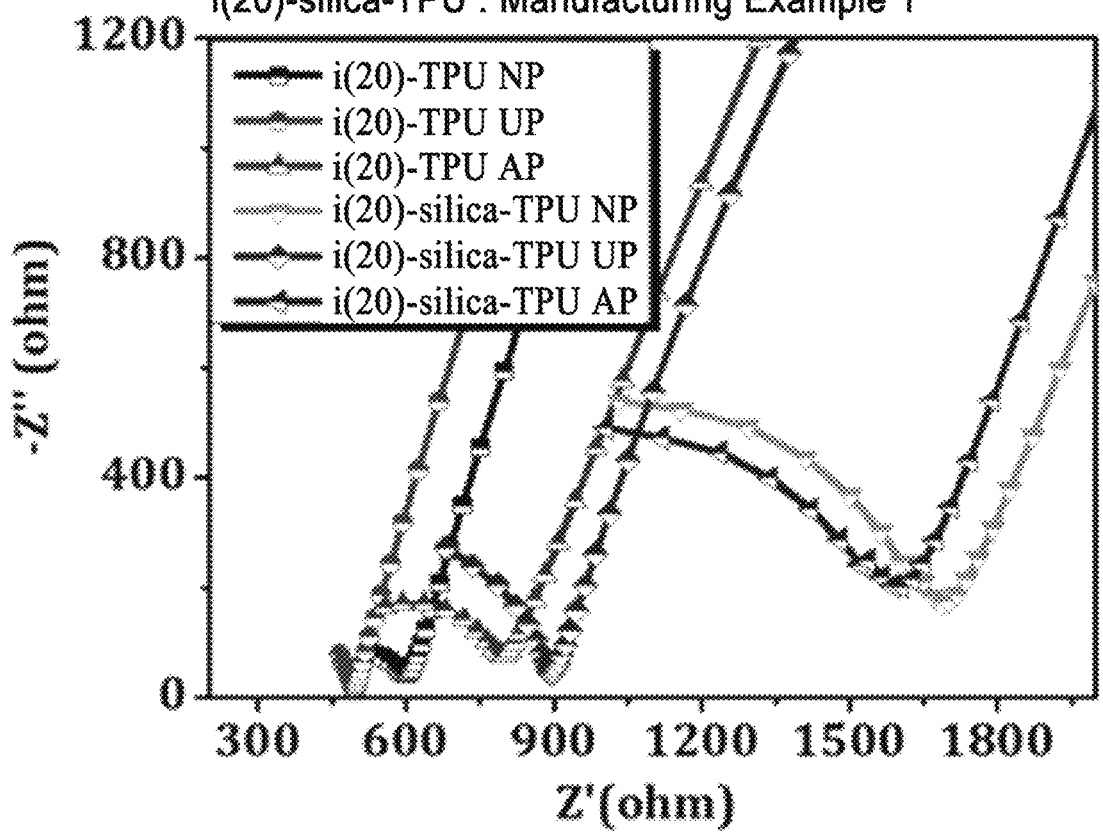
FIG. 14 is a graph showing the results of electrochemical impedance analysis of the pressure sensor according to Pressure Sensor Manufacturing Example 1 and Pressure Sensor Comparative Example.

FIG. 14 is a graph showing the results of electrochemical impedance analysis of the pressure sensor according to Pressure Sensor Manufacturing Example 1 and Pressure Sensor Comparative Example. Here, NP means No Pressure, UP means Under Pressure, and AP means After Pressure.

Referring to FIG. 14, the pressure sensor according to Pressure Sensor Manufacturing Example 1 compared to the pressure sensor according to Pressure Sensor Comparative Example shows very low ion mobility because positive and negative ions are confined to the micro silica particles in a state before pressure is applied. In addition, it can be seen that in the pressure sensor according to Pressure Sensor Manufacturing Example 1 compared to the pressure sensor according to Pressure Sensor Comparative Example, the difference between the ion mobility in the state before the pressure is applied and the state in which the pressure is applied is greater. From these results, it can be seen that the micro silica particles provided in the pressure sensor according to Pressure Sensor Manufacturing Example 1 induce local ion confinement, and the apparent difference in ion mobility before and after pressure is applied may mean that hydrogen bonds, ionic bonds, and pi bonds are weakened or disconnected by pressure, and thus ionic fluidity is changed.

As described above, the present invention has been described in detail using preferred embodiments, but the scope of the present invention is not limited to specific embodiments, and should be interpreted by the appended claims. In addition, those who have acquired ordinary knowledge in this technical field should understand that many modifications and variations are possible without departing from the scope of the present invention.

The invention claimed is:

1. A composite comprising:
an elastic polymer matrix;
particles dispersed in the elastic polymer matrix; and
an ionic liquid having a cation and an anion, wherein the cation and the anion are bound by an intermolecular interaction on a surface of the particles to form an ionic double layer,
wherein one of the cation and the anion of the ionic liquid is bonded to the surface of the particle by hydrogen bonding, and the other of the cation and the anion of the ionic liquid is bonded to the ion bonded on the surface of the particle by electrostatical attraction.

2. The composite of claim 1, wherein the particles include a metal, a metal oxide, a polymer, a carbon, or two or more of them.

3. The composite of claim 2, wherein the particles including the metal oxide is silica, alumina, zirconia, or titania.

4. The composite of claim 1, wherein the anion of the ionic liquid has N, O, S, or F in a molecule and is bonded on the surface of the particle by the hydrogen bonding.

5. The composite of claim 4, wherein the anion is selected from the group consisting of carboxylate, carbonate, phosphate, sulfonate, sulfate, cyanate, imide, bis(sulfonyl)imide, dicyanamide, hexafluoroantimonate, hydroxide, nitrite, tetrafluoroborate, and a combination thereof.

6. The composite of claim 5, wherein the anion is a bis(sulfonyl)imide represented by the following Formula 1:

[Formula 1]

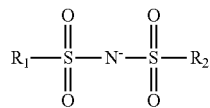

in Formula 1, each of $R_1$ and $R_2$ is independently fluorine or a fluorinated alkyl group having 1 to 4 carbon atoms.

7. The composite of claim 1, wherein the cation selected from the group consisting of ammonium, choline, imidazolium, phosphonium, pyridinium, pyrazolium, pyrrolidinium, piperidinium, morpholinium, sulfonium, and a combination thereof.

8. The composite of claim 1, wherein the elastic polymer matrix includes a thermoplastic elastic polymer that is a block copolymer of a hard segment and a soft segment.

9. The composite of claim 8, wherein one or more of the hard segment and the soft segment forms a hydrogen bond on the surface of the particle.

10. The composite of claim 8, wherein the thermoplastic elastic polymer is a polyester, a polyurethane, or a polyamide.

11. The composite of claim 1, wherein, in the composite, a fluidity of the ionic liquid is changed by stimulation applied to the composite.

12. A pressure sensor comprising:
a lower electrode;
an upper electrode; and
an active layer disposed between the electrodes and including an elastic polymer matrix, particles dispersed in the elastic polymer matrix, and an ionic liquid having a cation and an anion, wherein the cation and the anion are bound by an intermolecular interaction on a surface of the particle to form an ionic double layer,
wherein one of the cation and the anion of the ionic liquid is bonded to the surface of the particle by hydrogen bonding, and the other of the cation and the anion of the ionic liquid is bonded to the ion bonded on the surface of the particle by electrostatical attraction.

13. The pressure sensor of claim 12, wherein the elastic polymer matrix includes a thermoplastic elastic polymer, and
at least some of the particles are bonded to the thermoplastic elastic polymer by hydrogen bonds.

14. The pressure sensor of claim 13, wherein the thermoplastic elastic polymer is a thermoplastic polyurethane.

15. The pressure sensor of claim 12, wherein the particles are micro silica particles.

16. The pressure sensor of claim 12, wherein the ionic liquid includes bis(perfluorinated alkylsulfonyl)imide having a perfluorinated alkyl group having 1 to 4 carbon atoms for the anion and imidazolium for the cation.

17. The pressure sensor of claim 12, wherein each of the upper electrode and the lower electrode is independently a metal layer, a conductive metal oxide layer, a conductive carbon layer, a conductive polymer layer, or a semiconductor layer.

18. The pressure sensor of claim 12, wherein a surface of the active layer adjacent to the upper electrode includes a flat surface, a curved surface, or a plurality of convex portions.

19. The pressure sensor of claim 12, further comprises an upper substrate disposed on an upper surface of the upper electrode and a lower substrate disposed on a lower surface of the lower electrode,
wherein either or both of the upper substrate and the lower substrate is a flexible substrate, and among the upper electrode and the lower electrode, an electrode contacting the flexible substrate is a flexible electrode.

20. A method of manufacturing a pressure sensor comprising:
mixing particles and an ionic liquid to obtain an ionic liquid-particle mixture in which the ionic liquid is bound by intermolecular interactions and ionic bonds on a surface of the particles;
mixing the ionic liquid-particle mixture and an elastic polymer to prepare a composite; and disposing the composite between an upper electrode and a lower electrode wherein one of the cation and the anion of the ionic liquid is bonded to the surface of the particle by hydrogen bonding, and the other of the cation and the anion of the ionic liquid is bonded to the ion bonded on the surface of the particle by electrostatical attraction.

21. The method of claim 20, wherein the step of obtaining the ionic liquid-particle mixture includes providing a mixed solution of a metal oxide precursor and the ionic liquid, and generating metal oxide particles through a sol-gel reaction of the metal oxide precursor to bind the ionic liquid on the surface of the metal oxide particles by hydrogen bonds and ionic bonds.

22. The method of claim 21, wherein the metal oxide precursor is silicon alkoxide, titanium (IV) alkoxide, aluminum alkoxide, or zirconium (IV) alkoxide.

* * * * *